United States Patent
Benou et al.

(10) Patent No.: US 12,086,995 B2
(45) Date of Patent: Sep. 10, 2024

(54) VIDEO BACKGROUND ESTIMATION USING SPATIO-TEMPORAL MODELS

(71) Applicant: Intel Corporation, Santa Clara, CA (US)

(72) Inventors: Itay Benou, Tel Aviv (IL); Yevgeny Priziment, Tel Aviv (IL); Tzachi Herskovich, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 858 days.

(21) Appl. No.: 17/011,647

(22) Filed: Sep. 3, 2020

(65) Prior Publication Data

US 2020/0402243 A1    Dec. 24, 2020

(51) Int. Cl.
| | | |
|---|---|---|
| *G06T 7/194* | (2017.01) | |
| *G06T 7/254* | (2017.01) | |
| *G06V 10/44* | (2022.01) | |
| *G06V 10/80* | (2022.01) | |
| *G06V 20/40* | (2022.01) | |

(52) U.S. Cl.
CPC .............. *G06T 7/254* (2017.01); *G06T 7/194* (2017.01); *G06V 10/454* (2022.01); *G06V 10/803* (2022.01); *G06V 20/46* (2022.01); G06T 2207/10016 (2013.01); G06T 2207/20084 (2013.01); G06T 2207/20221 (2013.01)

(58) Field of Classification Search
CPC ..................... G06T 7/254; G06T 7/194; G06T 2207/10016; G06T 2207/20084; G06T 2207/20221; G06T 7/11; G06T 2207/10024; G06T 2207/20081; G06T 2207/20224; G06T 5/005; G06T 5/50; G06T 11/60; G06T 15/08; G06V 10/454; G06V 10/803; G06V 20/46; G06F 18/251; H04N 5/272; H04N 5/265; G06N 3/08

See application file for complete search history.

(56) References Cited

U.S. PATENT DOCUMENTS

2018/0308242 A1* 10/2018 Honjo ..................... G06T 7/251

FOREIGN PATENT DOCUMENTS

JP        2001357388 A   * 12/2001

OTHER PUBLICATIONS

C. Shen et al., Moving Object Detection of dynamic scenes using Spatio-temporal Context and background modeling, 2014, IEEE (Year: 2014).*
A. Morde et al., Learning a background model for change detection, 2012, IEEE (Year: 2012).*

(Continued)

*Primary Examiner* — Bernard Krasnic
(74) *Attorney, Agent, or Firm* — Hanley, Flight & Zimmerman, LLC

(57) ABSTRACT

Techniques related to video background estimation inclusive of generating a final background picture absent foreground objects based on input video are discussed. Such techniques include generating first and second estimated background pictures using temporal and spatial background picture modeling, respectively, and fusing the first and second estimated background pictures based on first and second confidence maps corresponding to the first and second estimated background pictures to generate the final estimated background picture.

20 Claims, 6 Drawing Sheets

(56) References Cited

OTHER PUBLICATIONS

D. Zeng et al., Background Subtraction With Real-Time Semantic Segmentation, Jan. 20, 2019, IEEE (Year: 2019).*
O. Le Meur et al., A Spatio-temporal Model of the Selective Human Visual Attention, 2005, IEEE International Conference on Image Processing 2005 (Year: 2005).*
M. Kim et al., A VOP generation tool: automatic segmentation of moving objects in image sequences based on spatio-temporal information, 1999, IEEE (Year: 1999).*
F. Chen et al., Block-Composed Background Reference for High Efficiency Video Coding, 2017, IEEE (Year: 2017).*
A. Kaup et al., Efficient prediction of uncovered background in interframe coding using spatial extrapolation, 1994, IEEE (Year: 1994).*
Y. Chen et al., Pixelwise Deep Sequence Learning for Moving Object Detection, 2019, IEEE (Year: 2019).*
S. R. Reeja et al., Real Time Video Denoising, 2012, IEEE (Year: 2012).*
S. Huang et al., Region-Level Motion-Based Foreground Segmentation Under a Bayesian Network, 2009, IEEE (Year: 2009).*

* cited by examiner

VIDEO BACKGROUND ESTIMATION USING SPATIO-TEMPORAL MODELS

BACKGROUND

The ability to reconstruct clean background images from input video sequences is a key component in numerous computer vision applications including foreground object detection, segmentation, and salient motion analysis. These techniques are used in a wide range of applications such as video surveillance, human-machine interface, object-based video coding, optical motion capture, and others. Specifically, highly accurate background estimation benefits multi-view volumetric video generation applications. For example, in immersive video and other contexts such as computer vision applications, a number of cameras are installed around a scene of interest such as a field of play. Using video attained from the cameras, a 3D model (e.g., via a point cloud volumetric model or other representation) is generated for the scene for each time instance of the video. A photo realistic view from a virtual view within the scene may then be generated to provide an immersive experience for a user. Such techniques allow a virtual camera to navigate in the 3D space to replay action from the scene at any location and from any perspective or angle within the scene. Producing high-quality background images (e.g., pictures with foreground objects removed and replaced with estimated background) for each individual camera view improves foreground segmentation and thereby provides more accurate 3D reconstruction of the scene.

Reconstruction of a clean background picture from video including foreground objects has numerous challenges due to a variety of nuisance factors in video sequences such as cluttered scenes, varying lighting conditions, dynamic background (e.g., a crowd in a sports event), non-static cameras, foreground objects that can fade or emerge from the background (e.g., cars in a parking lot), and other reasons. Existing techniques for clean background modeling and estimation have a variety of shortcomings.

In statistical models, background pixels are modeled by parametric (or non-parametric) density functions that attempt to approximate the distribution of observed background pixels. However, statistical models are limited to pixel-wise probabilistic modeling due to high dimensionality of whole images and, as a result, treat each pixel independently without consideration of spatial correlations between them, which significantly limits the quality of the estimated images. Furthermore, even after obtaining a probability density model of the background, sampling from this model (to generate a clean background image) is not always possible. Cluster-based models suppose each pixel in the frame can be assigned to one of several possible clusters, representing either foreground or background pixels. Pixels are represented using some representative features (e.g., their RGB values) and associated to the appropriate cluster based on this representation. However, cluster-based models process each pixel independently of its spatially neighboring pixels and, as a result, the estimated background may suffer from spatial inconsistencies, which can be seen as speckle noise. Subspace learning methods use a training set of images containing background pixels that is used to construct a background sub-space and to compute a projection matrix that is used to map images to this lower dimensional space. Then, by mapping a new image to the learned sub-space and back-projecting to the image space, a clean background approximation of the original image is attained. However, subspace learning methods have significant limitations such as an expectation that the size of the foreground objects in the training sequence are relatively small and that they do not occupy the same location for many frames. Furthermore, subspace learning methods have difficulties representing multi-modal data, its update process is computationally intensive, and applying it to multi-channel data is not straightforward due to higher dimensionalities. In deep learning models, fully convolutional neural networks (e.g., encoder-decoder architectures), sequential networks (e.g., recurrent neural nets), and 3D convolutional neural nets (e.g., applied to 3D video snippets) are used. However, deep learning methods suffer from drawbacks inclusive of being supervised learning methods (that require vast amount of human-annotated data), being computationally expensive, and being limited in their robustness and ability to quickly adapt to fast temporal variations in the scene. In image inpainting models, part of the input image is masked out (e.g., foreground objects) and the missing parts are completed from the visible parts. However, image inpainting models are designed to complete missing parts in images rather than perform complete background modeling.

It is desirable to reconstruct clean background images in video with high accuracy and stability. It is with respect to these and other considerations that the present improvements have been needed. Such improvements may become critical as the desire to provide new computer vision applications and others becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
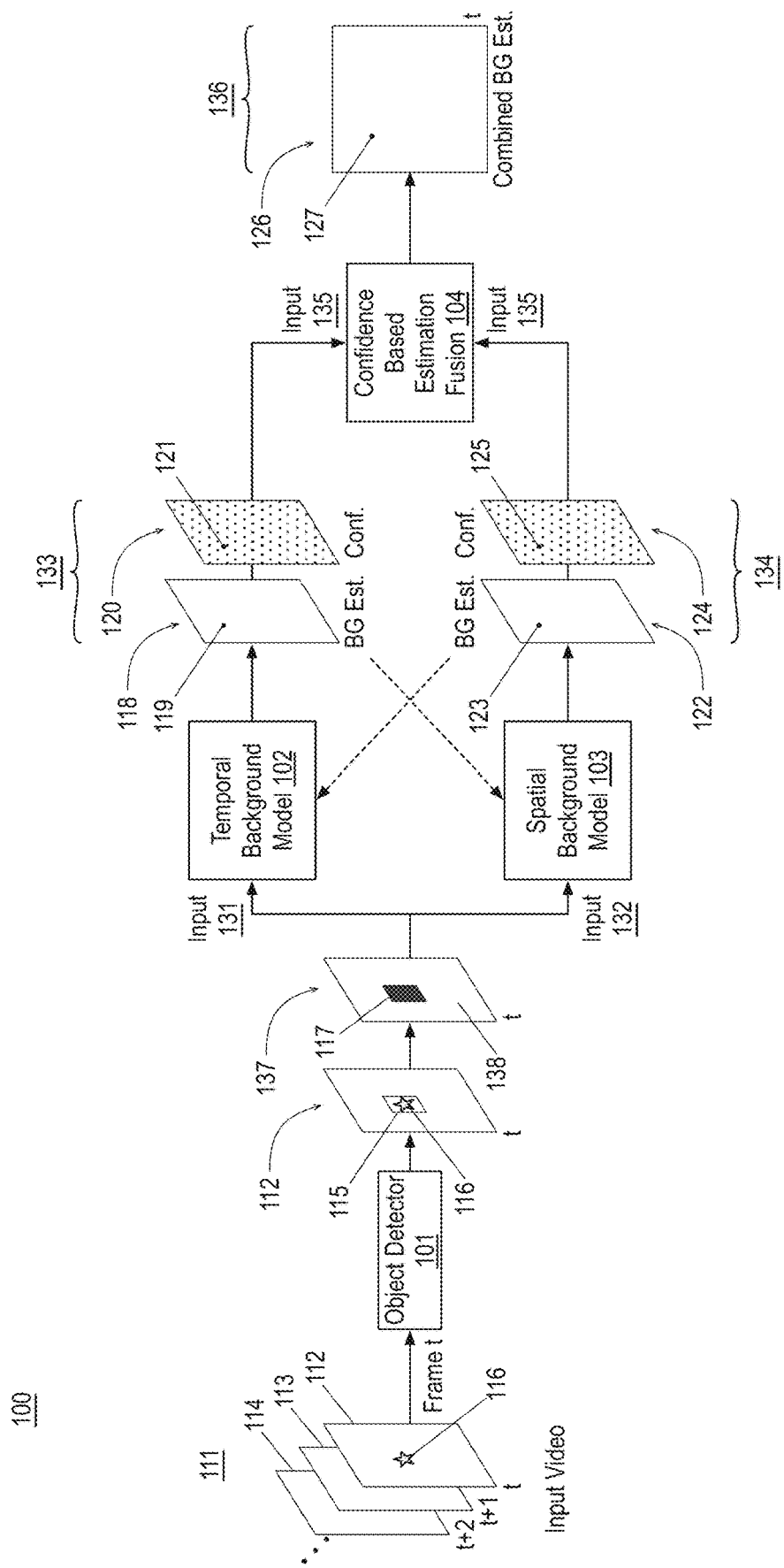
FIG. 1 illustrates an example system for performing video background estimation.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to performing video background estimation and, in particular, to using spatiotemporal models to generate an estimated background picture.

As described above, it is advantageous to efficiently reconstruct clean background images from input video. Notably, for each or some of a sequence of video pictures, it is desirable to generate background picture(s) that include a full background image with foreground objects removed. As used herein, the term background picture indicates a full picture with only background content. Such background content typically provides a backdrop for foreground content, which is usually of greater interest in the scene. The term picture is indicative of a video picture and is used herein interchangeably with the terms frame, video frame, image, and similar terms. Such pictures may be of any resolution and may be provided using any format and color space such as RGB, YUV, YCbCr, etc. For example, for each pixel of a picture, three values may be provided, one for each color channel of the employed color space.

The resultant or final estimated background picture generated using the techniques discussed herein may be used in any application or context such as computer vision applications, foreground object detection, image segmentation, salient motion analysis, video surveillance, human-machine interface, object-based video coding, optical motion capture, and others. Notably such techniques may be applied early in a video processing pipeline in the context of computer vision to provide necessary data that is employed by any modules later in the pipeline. That is, clean background pictures corresponding to input video is an important input to a variety of computer vision modules, applications, etc.

In some embodiments, both temporal and spatial background prediction models are applied based on the input video to generate corresponding estimated background pictures and confidence maps. The term background picture indicates a full picture with only background content (e.g., having foreground content removed). The term confidence map indicates, for each pixel of the corresponding estimated background picture, a measured confidence in the corresponding pixel. For example, the confidence values of the confidence map may be in the range of 0 to 1 inclusive and indicating no confidence to very high confidence. For example, the temporal background prediction model is applied for an input video picture using the input video picture and any number of temporally prior input video pictures to generate an estimated background picture and a confidence map for the input video picture. The estimated background picture and confidence map may be characterized as temporally based or the like. For example, the temporal background prediction model may be applied to the input video in a continuous manner for incoming video pictures. Furthermore, the spatial background prediction model is applied for the input video picture using only the input video picture and without use of any temporally prior input video pictures to generate another estimated background picture and corresponding confidence map for the input video picture. The estimated background picture and confidence map generated by the spatial background prediction model may be characterized as spatially based or the like. Notably, the spatial model uses only spatial cues from the current video picture while the temporal model uses information from temporally prior input video pictures.

The temporal and spatial background prediction models may be applied directly to the input video pictures or they may be aided by foreground object masks generated by application of object detection to the input video pictures. In embodiments where an object detector is employed, the discussed techniques may be applied specifically on foreground regions including detected objects. For example, the temporal and spatial background prediction models may be applied specifically to foreground regions in the image by using foreground object detection applications as a preliminary step. Furthermore, the temporal and spatial background prediction models may be connected such that the output of one model is used as input for the other model. Such temporal and spatial background prediction models may be implemented using a variety of models. Such characteristics are discussed further herein below.

The resultant temporally based and spatially based estimated background pictures and their corresponding confidence maps are then used to generate a resultant estimated background picture for the current input video picture. Notably, the temporally based and spatially based estimated background pictures are combined or fused to generate a resultant estimated background picture based on the confidence maps. In some embodiments, the fusion is based on application of a gating function that selects the pixel value corresponding to the higher confidence prediction at each pixel. In some embodiments, the fusion is performed by linear combination of the predicted pixel values using the confidence values as weights. In some embodiments, the fusion is performed by applying a deep learning based layer to an input volume including the temporally based estimated background picture, the spatially based estimated background pictures, and the corresponding confidence maps to generate an output volume inclusive of the resultant estimated background picture. In some embodiments, the fusion is performed by applying a deep learning based layer to the two predictions separately. In the alternative to deep learning layer(s), other learnable fusing, combination functions, or the like may be employed.

The techniques discussed herein combine temporal and spatial methods for background image estimation such that separate temporal and spatial modules are used to obtain high temporal responsiveness and robustness. Furthermore, a configurable confidence-based fusion module is provided that increases the reliability of the predicted images. Notably, the discussed techniques perform video background estimation by combining temporal and spatial models to producing high-quality and temporally stable clean background images via application of a foreground object detector, a temporal background model, a spatial background model, and a fusion model to combine or fuse the predicted background pictures from the temporal and spatial background models. Allowing the temporal and spatial models to predict separate background images and then combining them based on their respective confidences provides a variety of advantages such as objectively and subjectively high quality background images, robustness even in the context of heavily masked pictures, highly parallel processing, and flexibility.

FIG. 1 illustrates an example system 100 for performing video background estimation, arranged in accordance with at least some implementations of the present disclosure. As shown in FIG. 1, system 100 includes an object detector 101, a temporal background model module 102, a spatial background model module 103, and a confidence based estimation fusion module 104. As shown, system 100 receives input video 111 including any number of input video pictures 112, 113, 114, and so on such that input video pictures 112, 113, 114 are in a temporal order with video picture 112 corresponding to a time t, video picture 113 immediately following video picture 112 in a temporal order and corresponding to a time t+1, video picture 114 immediately following video picture 113 in a temporal order and corresponding to a time t+2, and so on. Although illustrated with respect to processing input pictures 112, 113, 114 in a temporal order for the sake of clarity of presentation, the input video pictures do not have to be processed in temporal order. In some embodiments, the video pictures (or frames) are processed in a forward order and then a backward order, over any number if iterations. In cases where the video pictures (or frames) are processed in temporal order, video picture 112 at time instance t is fed into system 100 before video picture 113 at time instance t+1 (and after any preceding video pictures), video picture 113 at time instance t+1 is fed into system 100 before video picture 114 at time instance t+2, and so on. Discussion herein is directed to processing video picture 112 for the sake of clarity. System 100 may be implemented via any suitable device or devices such as, for example, server, a personal computer, a laptop computer, a tablet, a phablet, a smart phone, a digital camera, a gaming console, a wearable device, a display device, an all-in-one device, a two-in-one device, or the like. For example, as used herein, a system, device, computer, or computing device may include any such device or platform.

Also as shown, video picture 112 includes any number of foreground objects such as of foreground object 116, which is illustrated using a star. In FIG. 1, background is illustrated as solid white for the sake of clarity of presentation. It is understood that such backgrounds include texture and other image elements that are to be in-filled or replicated in areas currently occluded by foreground objects 116 such that an entire background picture is reconstructed. An exemplary input picture and corresponding reconstructed background picture are illustrated herein with respect to FIGS. 4 and 5 relative to a sporting event; however, any suitable background may be attained using the techniques discussed herein. Such foreground objects 116 may be any objects such as people, animals, vehicles, other objects or combinations thereof. Notably, such foreground objects 116 are illustrated herein with respect to people and, in particular, to athletes, referees, etc. in a sporting contest. Input video 111 may be received from any source such as a video camera, a memory storage, etc. In some embodiments, the techniques discussed with respect to system 100 are applied to a single input video 111. In some embodiments, such techniques are applied, separately, to a number of input video sources each from a camera directed toward a particular scene. For example, system 100 may provide a portion of a volumetric video generation pipeline. Such volumetric video generation may include attaining video from a number of cameras directed toward a scene and generating a 3D model (e.g., via a point cloud volumetric model or other representation) representative of the scene for each time instance of the video. The 3D model may be painted using texture attained from the scene and used in a variety of contexts such as providing a photo realistic view from any virtual view within the scene. Such views provide a highly immersive user experience.

Figure 2:
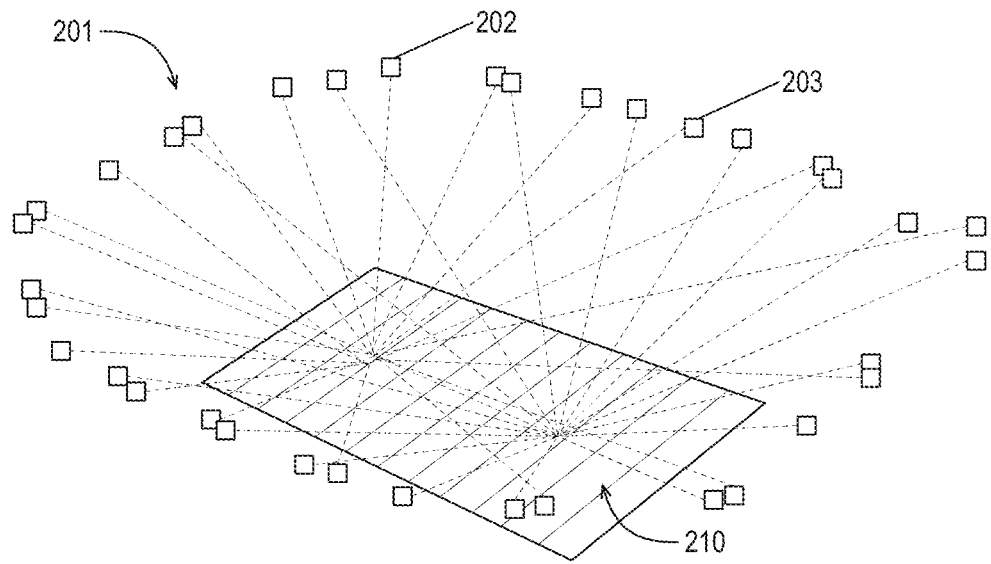
FIG. 2 illustrates an example camera array trained on an example scene.

FIG. 2 illustrates an example camera array 201 directed toward an example scene 210, arranged in accordance with at least some implementations of the present disclosure. In the illustrated embodiment, camera array 201 includes 36 cameras directed toward a sporting field. However, camera array 201 may include any suitable number of cameras directed toward scene 210 such as not less than 15 cameras. For example, camera array 201 may be directed toward scene 210 to generate a 3D model of scene 210 and fewer cameras may not provide adequate information to generate the 3D model. Camera array 201 may be mounted to a stadium (not shown) surrounding the sporting field of scene 210 and along the ground surrounding the sporting field, calibrated, and directed toward scene 210 to capture simultaneous video frames of scene 210. As shown, each camera of camera array 201 has a particular view of scene 210. For example, camera 202 has a first view of scene 210, camera 203 has a second view of a scene, and so on. As used herein, the term view indicates the image content of an image plane of a particular camera of camera array 201 or image content of any view from a virtual camera located within scene 210. Notably, input video for some or all of the cameras of camera array 201 may be provided for processing via system 100 or any number of such systems to generate a clean background picture for some or all of the associated views.

Returning to FIG. 1, as shown, input video 111 is received by object detector 101. Input video 111 may be in any suitable format and may be of any resolution. In some embodiments, input video 111 is a raw RGB video sequence and each of video pictures 112, 113, 114 includes a number of pixels, at the defined resolution (e.g., video graphics array (VGA), high definition (HD), Full-HD (e.g., 1080p), 4K resolution video, 8K resolution video, etc.), each having a corresponding R value, G value, and B value. Object detector 101 applies object detection (e.g., in a picture by picture manner) to each of video pictures 112, 113, 114 to detect foreground objects 116 and to provide corresponding bounding boxes as illustrated with respect to bounding box 115. It is noted that some bounding boxes may include multiple detected foreground objects 116. Bounding boxes 115 may be represented using any suitable data structure such as an indicator of a location of a top left corner and horizontal and vertical sizes of each bounding box. Based on bounding boxes 115, a corresponding masked picture 137 is generated such that a foreground object mask 117 is provided therein and includes first pixel values (e.g., values of 0 or 255) for the region of the detected bounding box 115 and background pixel values 138 (e.g., values corresponding to those of video picture 112) for non-object regions (i.e., background pixels). Notably, a masked picture or object mask is generated for each of video pictures 112, 113, 114. It is noted that although system 100 is illustrated with respect to temporal background model module 102 and spatial background model module 103 being applied to masked picture 137 (e.g., based on input video 111 and object masks 117), in some embodiments, temporal background model module 102 and spatial background model module 103 may be applied directly to video pictures 112, 113, 114 absent such masking. However, such masking typically provide improved results.

For example, implementation of system 100 may include application of picture by picture (e.g., frame-by-frame) foreground object detection via object detector 101. The input to object detector 101 is video picture 112 (e.g., a raw RGB frame) of an input video sequence such as input video 111. Video picture 112 may be characterized as $I(x, y, t)$ where x, y represents locations within video picture 112 and t represents the time stamp of video picture 112. The output of object detector 101 is one or more (e.g., a set) rectangular detections around foreground objects 116 appearing in video picture 112. Object detector 101 may implement any suitable object detection techniques such as machine-learning based detection or other. For example, object detector 101 may implement Viola-Jones object detection, scale-invariant feature transform detection, histogram of gradient feature detection, deep learning based detection, single shot multi- box detection, you only look once detection, etc. As shown, once foreground objects 116 are detected, they are masked out via object mask 117 and resulting picture or frame $I_M(x, y, t)$ may be provided to temporal background model module 102 and spatial background model module 103.

Temporal background model module 102 receives masked pictures 137 (e.g., one each corresponding to video pictures 112, 113, 114) or video pictures 112, 113, 114 and temporal background model module 102 applies temporal background modeling using the masked pictures 137 (or current video picture 112) and any number of temporally prior masked pictures 137 (or video pictures 113, 114). Discussion of temporal background model module 102 continues now only with respect to masked pictures 137. In some embodiments, temporal background model module 102 applies continual temporal modeling and updates the continuous model based on the most currently received masked picture 137. As shown, temporal background model module 102 generates an estimated background picture 118 and a corresponding confidence map 120. Estimated background picture 118 includes a number of pixel values 119 at, for example, the resolution of video picture 112, such that each pixel value 119 includes a value for each color channel employed (e.g., estimated background picture 118 is an RGB image). Confidence map 120 indicates, for each pixel of estimated background picture 118, a measured confidence in the corresponding pixel value. For example, confidence value 121 provides a confidence in pixel value 119 of estimated background picture 118. Confidence values 121 may include any suitable values such as values in the range of 0 to 1 inclusive such that low values indicate lower confidence and higher values indicate higher confidence.

Temporal background model module 102 may generate estimated background picture 118 using any suitable technique or techniques. In some embodiments, temporal background model module 102 implements codebook background modeling. Furthermore, confidence values 121 of confidence map 120 may include any suitable values. In some embodiments, confidence value 121 is a distance (e.g., L2 distance measure) between pixel value 119 of estimated background picture 118 and a corresponding pixel value (e.g., at the same location) of video picture 112. In some embodiments, confidence value 121 is variance of a statistical model used to generate estimated background picture 118. For example, temporal background model module 102 may employ an ongoing statistical model to generate estimated background picture 118. That is, the ongoing statistical model is used to generate pixel value 119. Furthermore, the variance for each pixel (or other statistical measure of spread) of the statistical model is used to generate confidence values 121 of confidence map 120. That is, the corresponding spread (e.g., variance) used to generate pixel value 118 can be used (e.g., after optional scaling) as confidence value 121. In some embodiments, masked pictures 137 (e.g., including a current masked picture and any number of temporally prior masked pictures) provides an input volume or input picture 131 and temporal background model module 102 is applied to input picture 131 to generate estimated background picture 118 and confidence map 120. For example, estimated background picture 118 and confidence map 120 may be characterized as an output volume 133.

In some embodiments, temporal background model module 102 utilizes non-masked pixels 138 (e.g., of video picture 112) to update (e.g., in an ongoing manner) an existing clean background model. Once the update is complete, estimated background picture 118 (e.g., a clean background image) is generated by weighting different criteria inclusive of frequency, recentness, and maximal negative run length of the background pixel value. Estimated background picture 118, corresponding to video picture 112, may be characterized as $\widehat{I_T}(x, y, t)$. As discussed, in addition to estimated background picture 118, temporal background model module 102 also produces confidence map 120, which may be characterized as $\widehat{C_T}(x, y, t)$, that includes confidence values 121 or probabilities, $p \in [0, 1]$, representing the confidence level of its prediction at pixel location (x, y). In some embodiments, confidence map 120 is determined by factoring in the pixel-wise distance between visual input images and the temporal statistics of the background values.

Spatial background model module 103 also receives masked picture 137 or video picture 112 and spatial background model module 103 applies spatial background modeling to masked picture 137 (or video picture 112). Notably, spatial background model module 103 does not utilize other temporally prior pictures of input video 111. Spatial background model module 103 generates an estimated background picture 122 and a corresponding confidence map 124. As with estimated background picture 118, estimated background picture 122 includes a number of pixel values 123 including a value for each color channel employed (e.g., estimated background picture 122 is an RGB image). Furthermore, confidence map 124 indicates, for each pixel of estimated background picture 122, a measured confidence in the corresponding pixel value such that, for example, confidence value 125 provides a confidence in pixel value 123 of estimated background picture 122. In some embodiments, confidence values 125 are in the range of 0 to 1 inclusive such that low values indicate lower confidence and higher values indicate higher confidence, although any value range may be used.

Spatial background model module 103 may generate estimated background picture 122 using any suitable technique or techniques. In some embodiments, spatial background model module 103 implements an inpainting algorithm or technique. In some embodiments, spatial background model module 103 implements neural network layer or layers (e.g., a pretrained convolutional neural network, CNN, layer or layers). Furthermore, confidence values 125 of confidence map 124 may be generated using any suitable technique or techniques. In some embodiments, masked picture 137 provides an input volume or input 132 and spatial background model module 103 is applied to input 132 to generate estimated background picture 122 and confidence map 124. For example, estimated background picture 122 and confidence map 124 may be characterized as an output volume 134.

In some embodiments, spatial background model module 103 is provided masked picture 137, $I_M(x, y, t)$, and spatial background model module 103 predicts pixel values for object mask 117 of masked picture 137 (e.g., the masked out region of the frame) based on available visible content (e.g., non-masked pixels 138). Spatial background model module 103 outputs estimated background picture 122, $\widehat{I_S}(x, y, t)$, that best matches the context provided by non-masked pixels 138. In some embodiments, the pixel values of object mask 117 are generated using an inpainting algorithm. In some embodiments, the pixel values of object mask 117 are generated via a learning-based inpainting algorithm (e.g., neural network layer or layers) optimized (e.g., in pretraining) to perform image completion on a separate training dataset. In some embodiments, the pixel values of object mask 117 are generated via a patch matching technique (e.g., PatchMatch), which is not based on neural network application. As with temporal background model module 102, spatial background model module 103 further outputs a corresponding confidence map 124, which may be characterized as $\widehat{C_S}(x, y, t)$. In some embodiments, the discussed learning-based inpainting algorithm provides both estimated background picture 122 and confidence map 124. That is, a neural network layer or layers may be applied to input 132 including masked picture 137 (e.g., three feature maps: one for each color channel of masked picture 137) to generate output 134 including output volume 134 (e.g., four feature maps: one for each color channel of estimated background picture 122 and one for confidence map 124).

As discussed, in some embodiments, temporal background model module 102 and spatial background model module 103 are applied in parallel. As shown, in some embodiments, the output of one or both of temporal background model module 102 and spatial background model module 103 may be provide to the other of temporal background model module 102 and spatial background model module 103 as an input. That is, applying temporal background model module 102 may be further based on estimated background picture 118 and/or confidence map 120. In addition or in the alternative, applying spatial background model module 103 may be further based on estimated background picture 122 and/or confidence map 124.

For example, temporal background model module 102 may feed its prediction as an input to spatial background model module 103. In some embodiments, instead of operating on masked picture 137, spatial background model module 103 treats estimated background picture 118 (e.g., the temporal background prediction) as an initial estimation, and spatial background model module 103 refines it in areas with low confidence according to available spatial information in masked picture 137. Similarly, spatial background model module 103 can feed temporal background model module 102, which can refine the prediction according to its temporal model.

In some embodiments, estimated background picture 118 and/or confidence map 120 are included in input volume 132 and spatial background model module 103 applies a pretrained neural network layer or layers to generate estimated background picture 122 and confidence map 124. In other embodiments, estimated background picture 118 and confidence map 120 may be used to provide pixels of estimated background picture 122, which are in turn used to estimate other pixels of estimated background picture 122. For example, for very high confidence pixel values (as indicated by confidence map 120 and based on an applied threshold), such pixels may be copied and used in estimated background picture 122. Other pixels of estimated background picture 122 may then be generated using such copied pixels either using inpainting techniques or by including such copied pixels in the feature maps of input volume 132. That is, high confidence pixels may first be copied to input volume 132 and then neural network layer or layers are applied to input volume 132 to generate estimated background picture 122 and confidence map 125 as discussed above. In some embodiments, applying spatial background model module 103 includes determining a pixel value in estimated background picture 122 using the spatial background picture model in response to a corresponding confidence value of confidence map 121 not exceeding a threshold (e.g., of 0.8 or 0.9) or copying a corresponding pixel value of estimated background picture 118 to estimated background picture 122 in response to the corresponding confidence value of confidence map 121 exceeding the threshold.

As shown in FIG. 1, estimated background picture 118, confidence map 120, estimated background picture 122, and confidence map 124 are received by confidence based estimation fusion module 104, which combines or fuses estimated background picture 118 and estimated background picture 122 to generate a final or resultant estimated background picture 126 having pixel values 127 representative of a background image absent any foreground objects (e.g., estimated background picture 126 is an RGB image absent foreground objects). Estimated background picture 118 and estimated background picture 122 may be merged or fused using any suitable technique or techniques. For example, given estimated background picture 118 and confidence map 120 (e.g., ($\hat{I}_T$ (x, y, t); $\hat{C}_T$(x, y, t))) and estimated background picture 122 and confidence map 124 (e.g., ($\hat{I}_S$ (x, y, t); $\hat{C}_S$ (x, y, t))) provided by temporal background model module 102 and spatial background model module 103, respectively, confidence based estimation fusion module 104 fuses, combines, or merges estimated background pictures 118, 122 to produce a combined estimated background picture 126 based on confidence maps 120, 124. In some embodiments, combined estimated background picture 126 is generated as shown in Equation (1):

$$\hat{I}_F(x,y,t) = f((\hat{I}_T(x,y,t); \hat{C}_T(x,y,t)),(\hat{I}_S(x,y,t); \hat{C}_S(x,y,t))) \quad (1)$$

where $\hat{I}_{F_F}$ (x, y, t) is the final, resultant estimated background picture 126 and $f$ is the fusion function. As discussed, the fusion function employed by confidence based estimation fusion module 104 may include any fusion function and the fusion function may be selected by a user or preconfigured or the like.

In some embodiments, the fusion function is a gating function that selects the higher-confidence prediction at each pixel. For example, confidence based estimation fusion module 104 may generate estimated background picture 126 by selecting, for each pixel of estimated background picture 126, pixel value 127 as the pixel value from pixel value 119 or pixel value 123 depending on which of confidence values 121, 125 is higher. For example, in response to confidence value 121 exceeding confidence values 125, pixel value 119 is selected and, in response to confidence value 125 exceeding confidence values 121, pixel value 123 is selected. The gating logic described above can presented as follows in Equation (2):

$$\hat{I}_F(x, y, t) = \begin{cases} \hat{I}_T(x, y, t); & \hat{C}_T(x, y, t) > \hat{C}_S(x, y, t) \\ \hat{I}_S(x, y, t); & \text{otherwise} \end{cases} \quad (2)$$

where $\hat{I}_F$ (x, y, t) is final, resultant estimated background picture 126 and, as shown, a pixel value from $\hat{I}_T$ (x, y, t) is selected when $\hat{C}_T$(x, y, t)>$\hat{C}_S$ (x, y, t) and a pixel value is selected from $\hat{I}_S$ (x, y, t) otherwise.

In some embodiments, the fusion function applies a linear combination of pixel values from estimated background pictures 118, 122 weighted using the confidence values of confidence maps 120, 124 to determine each pixel value of estimated background picture 126. For example, pixel value 127 may be generated as a weighted average of pixel value 119 and pixel value 123 weighted based on confidence value 121 and confidence value 125, respectively. In some embodiments, pixel value 127 is a sum of (a) a product of pixel value 119 and a ratio of confidence value 121 to a sum of confidence values 121, 125 and (b) a product of pixel value 125 and a ratio of confidence value 125 to a sum of confidence values 121, 125. For example, pixel values of estimated background picture 126 may be determined as follows in Equation (3):

$$\hat{I}_F(x, y, t) = \frac{\hat{C}_T(x, y, t)}{\hat{C}_T(x, y, t) + \hat{C}_S(x, y, t)} \hat{I}_T(x, y, t) + \frac{\hat{C}_S(x, y, t)}{\hat{C}_T(x, y, t) + \hat{C}_S(x, y, t)} \hat{I}_S(x, y, t) \quad (3)$$

where $\hat{I}_F$ (x, y, t) is estimated background picture 126 and, as shown, each pixel value of estimated background picture 126 is weighted sum of pixel values from $\hat{I}_T$ (x, y, t) and $\hat{I}_S$ (x, y, t) weighted based on confidence values from $\hat{C}_T$(x, y, t) and $\hat{C}_S$ (x, y, t).

In some embodiments, the fusion function applies a pretrained neural network layer or layers (e.g., a pretrained convolutional neural network, CNN, layer or layers) to generate estimated background picture 126. For example, one or more pretrained neural network layer or layers may be generated and applied to an input volume or input picture 135 including estimated background pictures 118, 122 and confidence maps 120, 124 (e.g., eight feature maps: one for each color channel of estimated background pictures 118, 122 and one for each of confidence maps 120, 124) to generate an output volume of estimated background picture 126 (e.g., three feature maps: one for each color channel of estimated background picture 126). In some embodiments, pretrained neural network layer or layers of confidence based estimation fusion module 104 and the pretrained neural network layer or layers of spatial background model module 103 are trained simultaneously using the same training set.

As discussed below, in some embodiments, such fusion functions may be adaptively selected based on confidence maps 120, 124 or other factors. Estimated background picture is stored to memory of system 100, provided to another device, or the like for use in any suitable application. In some embodiments, estimated background picture 126 is used by one or more of a computer vision application, a foreground object detection application, an image segmentation application, a salient motion analysis application, a video surveillance application, a human-machine interface application, an object-based video coding application, or an optical motion capture application. Such applications may be performed by system 100 or another device or system.

Figure 3:
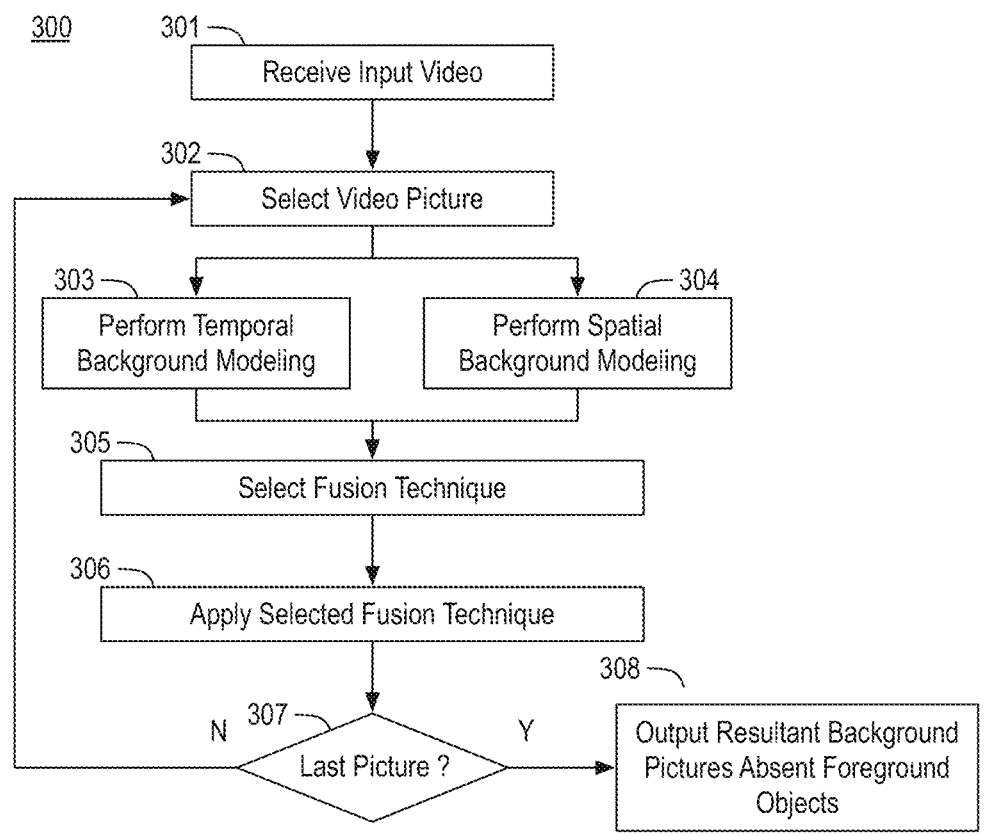
FIG. 3 illustrates an example process for generating an estimated background picture based on one or more input images.

FIG. 3 illustrates an example process 300 for generating an estimated background picture based on one or more input images, arranged in accordance with at least some implementations of the present disclosure. Process 300 may include one or more operations 301-308 as illustrated in FIG. 3. For example, operations 301-308 may be performed by system 100. Although discussed with respect to received input video, process 300 may output a resultant background image after processing a single input image. Specifically, process 300 does not have to wait until a "last picture" to output a resultant background image. The resultant image can be generated by sampling from the learned background model.

Processing begins at operation 301, where input video is received. The input video may include any number of video pictures and may be in any suitable format. Processing continues at operation 302, where a video picture of the input video is selected. For example, a current video picture may be selected and the selection of video pictures may be in a temporal order.

Processing continues at operation 303, where temporal background modeling is performed based in part on the video picture selected at operation 302 to generate an estimated background picture absent any foreground object and a corresponding confidence map. For example, the estimated background picture attempts to reconstruct the background and replace any foreground with background texture and content. In some embodiments, operation 303 is preceded by an object detection and masking operation such that the temporal background modeling is performed based on a masked image including background region and masked foreground regions. For example, the masked regions may include an indicator value such as 0 or 255 or another value. The masked regions may be indicated using such masking, a separate mask layer, or bounding box information. In some embodiments, the temporal background modeling includes codebook based modeling and the confidence map is determined by factoring in the piecewise distance between visual input images and the temporal statistics of the background values attained via the modeling.

Processing also continues from operation 302 at operation 304, where spatial background modeling is performed based in part on the video picture selected at operation 302 to generate another estimated background picture absent any foreground object and another corresponding confidence map. Notably, operations 303, 304 may be performed in any order or at least partially in parallel. In some embodiments, operations 303, 304 are performed independently of one another. As with operation 303, in some embodiments, operation 304 is preceded by an object detection and masking operation such that the spatial background modeling is performed based on a masked image including background region and masked foreground regions. In some embodiments, the spatial background modeling includes application of an inpainting neural network inclusive of one or more pretrained neural network layer to an input volume including the video picture or the masked picture to generate an output volume including the estimated background picture and the confidence map.

Processing continues at operation 305, where a fusion technique to fuse or combine the estimated background pictures generated at operations 303, 304 is selected. The fusion technique may be selected using any suitable technique or techniques. In some embodiments, the fusion technique is user selected. In some embodiments, the fusion technique is selected based on the confidence maps generated at operations 303, 304. For example, when there is a large gap between the confidence values, it may be desirable to apply a gating function as discussed with respect to Equation (2). In contrast, when there is lesser gap, it may be desirable to apply linear weighting as discussed with respect to Equation (2). Such fusion technique selection may be provided at any level: it may be decided at the pixel level, the picture level, or for regions of the pictures.

In some embodiments, combining the estimated background pictures based on the confidence maps includes generating, for each pixel of the resultant estimated background picture, a magnitude difference between confidence values of the confidence maps (e.g., as an absolute value difference). In response to the magnitude difference exceeding a threshold (e.g., of 0.6 or more), the pixel value corresponding to the higher confidence value is selected. In response to the magnitude difference not exceeding the threshold the pixel value is generate using a weighted average of the pixel values.

In some embodiments, combining the estimated background pictures based on the confidence maps includes determining an overall temporal confidence value based on the temporal based confidence map (as generated at operation 303) and an overall spatial confidence value based on the spatial confidence map (as generated at operation 304), determining a magnitude difference between the overall temporal confidence value and the overall spatial confidence value (e.g., an absolute value difference), and selecting a gating based fusion (as discussed with respect to Equation (2)) in response to the magnitude difference exceeding a threshold (e.g., of 0.6 or more) or a linear combination fusion (as discussed with respect to Equation (3)) or pretrained neural network based fusion in response to the magnitude difference not exceeding the threshold.

Processing continues at operation 306, where the selected fusion technique is applied to generate a combined estimated background picture. In gating fusion applications, the pixel value corresponding to the higher confidence value is selected for each pixel. In linear weighting fusion applications, each pixel is determined as a weighted average of the pixel values weighted using the confidence values. In learning-based techniques, one or more pretrained neural network layers are applied to an input volume including the estimated background pictures and the confidence maps to generate the resultant estimated background picture.

Processing continues at decision operation 307, where a determination is made as to whether the input picture selected at operation 302 is the last picture to be processed. If not, processing continues at operation 302 as discussed until a final picture is processed. If so, processing continues at operation 308, where the resultant estimated background picture(s) are output for use in any application discussed herein such as volumetric video generation applications. Notably a resultant background image may be generated for each input image or frame.

The techniques discussed herein provide high subjective and objective quality resultant estimated background pictures that are robust to temporal change and a variety of imaging contexts.

Figure 4:
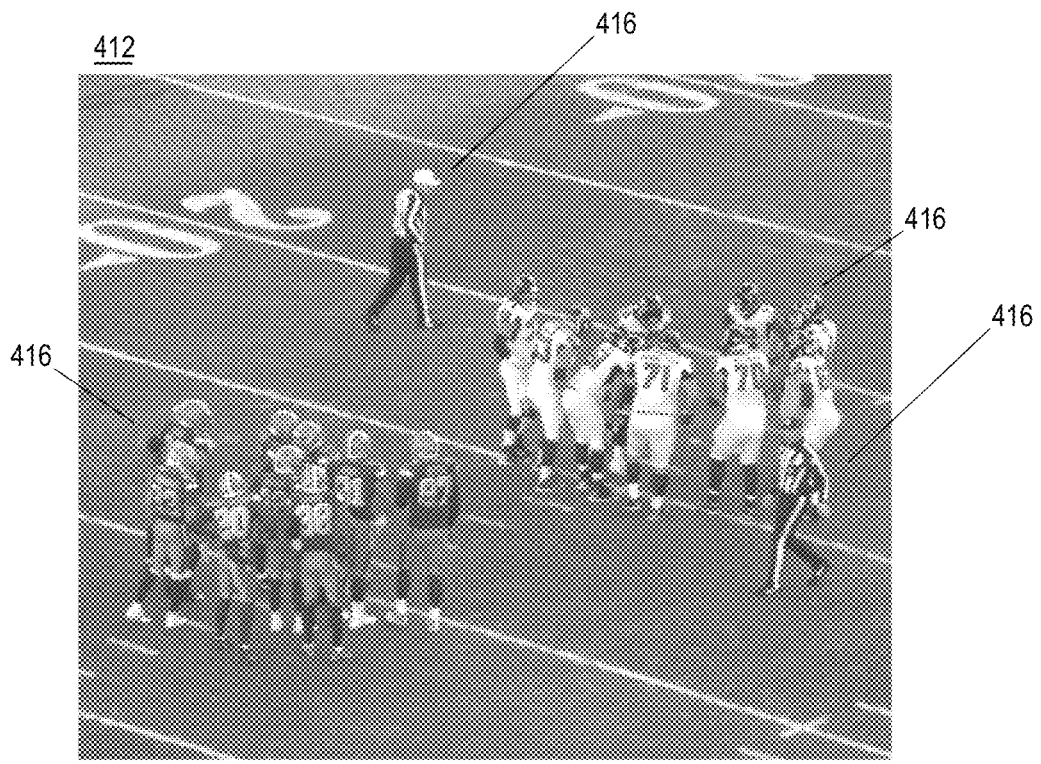
FIG. 4 illustrates an example input video picture.

FIG. 4 illustrates an example input video picture 412, arranged in accordance with at least some implementations of the present disclosure. As shown, example input video picture 412 (analogous to input video picture 112) includes a number of foreground objects 416 (analogous to foreground objects 116) and it is desired to generate an estimated background picture such that foreground objects 416 are removed. Input video picture 412 is illustrative of a sporting event with foreground objects 416 including players and referees. For example, input video picture 412 may be attained from video from one camera of camera array 201 and other video streams may be attained and processed. Such contexts may be suitable for the processing discussed herein as sporting events are high profile events for which volumetric video generation and virtual views in the 3D scene may be desirable. However, as discussed, the techniques discussed herein may be applied in any context.

Figure 5:
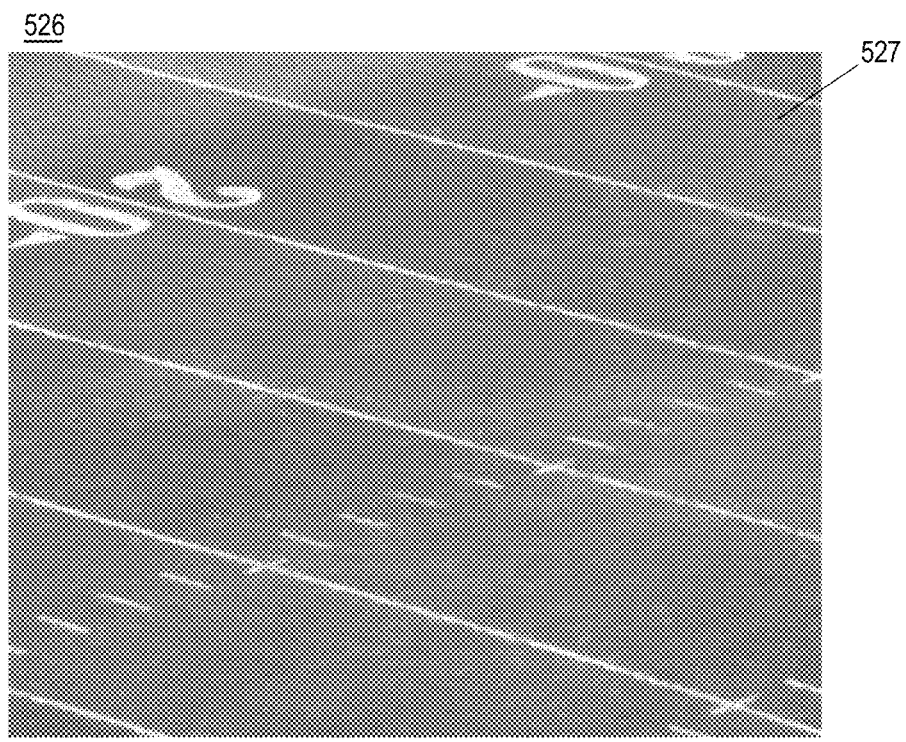
FIG. 5 illustrates an example resultant estimated background picture.

FIG. 5 illustrates an example resultant estimated background picture 526, arranged in accordance with at least some implementations of the present disclosure. As shown, example resultant estimated background picture 526 (analogous to resultant estimated background picture 126) includes pixel values 527 (analogous to pixel values 127) that provide a representation or reconstruction of example input video picture 412 with foreground objects 416 absent. Notably, resultant estimated background picture 526 provides a clean reconstruction that has high objective and subjective image quality such that resultant estimated background picture 526 is a highly plausible view of example input video picture 412 with foreground objects 416 removed. As discussed, resultant estimated background picture 526 is useful in a variety of applications such as computer vision applications inclusive of volumetric video generation.

Figure 6:
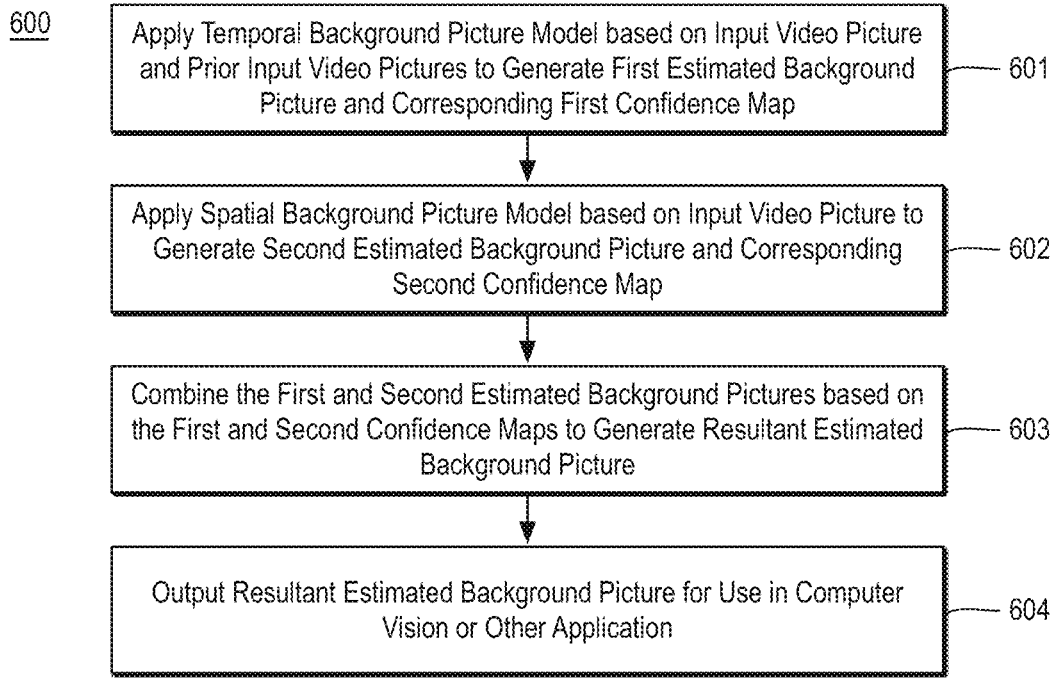
FIG. 6 is a flow diagram illustrating an example process for performing video background estimation.

FIG. 6 is a flow diagram illustrating an example process 600 for performing video background estimation, arranged in accordance with at least some implementations of the present disclosure. Process 600 may include one or more operations 601-604 as illustrated in FIG. 6. Process 600 may form at least part of video background estimation process, for example. By way of non-limiting example, process 600 may form at least part of a process as performed by system 100 as discussed herein. Furthermore, process 600 will be described herein with reference to system 700 of FIG. 7.

Figure 7:
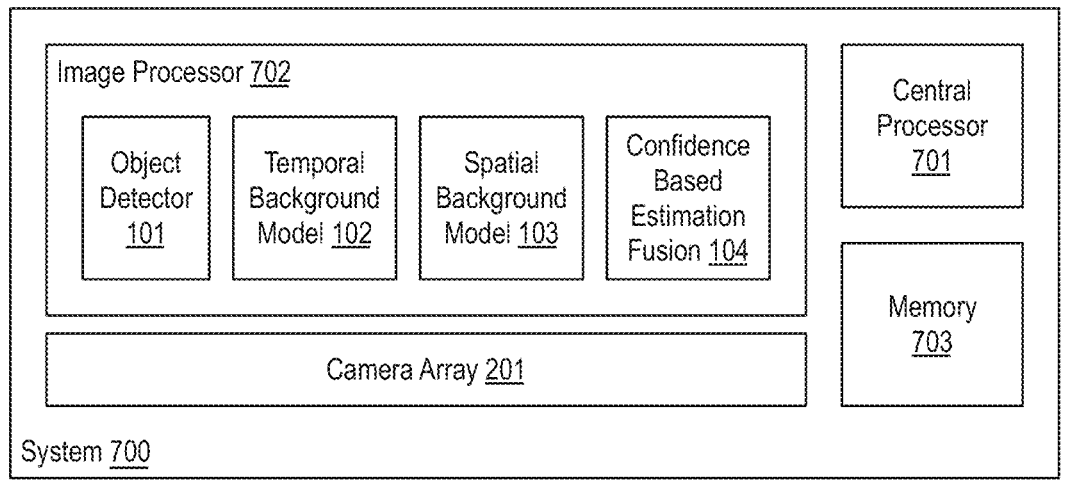
FIG. 7 is an illustrative diagram of an example system for performing video background estimation.

FIG. 7 is an illustrative diagram of an example system 700 for performing video background estimation, arranged in accordance with at least some implementations of the present disclosure. As shown in FIG. 7, system 700 includes a central processor 701, an image processor 702, a memory 703, and camera array 201. Also as shown, image processor 702 may include or implement object detector 101, temporal background model module 102, spatial background model module 103, and confidence based estimation fusion module 104. In the example of system 700, memory 703 may store input video pictures, bounding box data, object mask data, estimated background picture data, confidence map data, neural network layer data, or any other data discussed herein.

As shown, in some examples, one or more or portions of object detector 101, temporal background model module 102, spatial background model module 103, and confidence based estimation fusion module 104 are implemented via image processor 702. In other examples, one or more or portions of object detector 101, temporal background model module 102, spatial background model module 103, and confidence based estimation fusion module 104 are implemented via central processor 701, an image processing unit, an image processing pipeline, an image signal processor, or the like. In some examples, one or more or portions of object detector 101, temporal background model module 102, spatial background model module 103, and confidence based estimation fusion module 104 are implemented in hardware as a system-on-a-chip (SoC). In some examples, one or more or portions of object detector 101, temporal background model module 102, spatial background model module 103, and confidence based estimation fusion module 104 are implemented in hardware via a FPGA.

Image processor 702 may include any number and type of image or graphics processors or processing units that may provide the operations as discussed herein. Such operations may be implemented via software or hardware or a combination thereof. For example, image processor 702 may include circuitry dedicated to manipulate and/or analyze frames or frame data obtained from memory 703. Central processor 701 may include any number and type of processors, processing units, or modules that may provide control and other high level functions for system 700 and/or provide any operations as discussed herein. Memory 703 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 703 may be implemented by cache memory. In an embodiment, one or more or portions of object detector 101, temporal background model module 102, spatial background model module 103, and confidence based estimation fusion module 104 are implemented via an execution unit (EU) of image processor 702. The EU may include, for example, programmable logic or circuitry such as a logic core or cores that may provide a wide array of programmable logic functions. In an embodiment, one or more or portions of object detector 101, temporal background model module 102, spatial background model module 103, and confidence based estimation fusion module 104 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 6, process 600 begins at operation 601, where a temporal background picture model is applied based on an input video picture and one or more temporally prior input video pictures to generate a first estimated background picture and a corresponding first confidence map for the input video picture. The temporal background picture model may be applied using any suitable technique or techniques. In some embodiments, temporal background picture model is a codebook based model. The first confidence map may include any suitable values. In some embodiments, the first confidence map includes one of a distance between corresponding pixel values of the first estimated background picture and the input video picture or a variance of a statistical model used to generate the first estimated background picture.

Processing continues at operation 602, where a spatial background picture model is applied based on the input video picture to generate a second estimated background picture and a corresponding second confidence map for the input video picture. The spatial background picture model may be applied using any suitable technique or techniques. In some embodiments, generation of the second estimated background picture and the second confidence map includes application of a neural network layer to an input volume based on the input video picture to generate an output volume including the second estimated background picture and the second confidence map.

The discussed temporal background picture model and spatial background picture model application may be based on direct application to the input video picture and the one or more temporally prior input video pictures and only the input video picture, respectively. Alternatively, the temporal background picture model and spatial background picture model may be applied to masked pictures including background content from the input video pictures and masked regions masked based on object detection. In some embodiments, process 600 further includes applying foreground object detection to the input video picture to generate a foreground object mask, such that at least one of generating the first estimated background picture and the first confidence map or generating the second estimated background picture and the second confidence map is further based on the foreground object mask.

Furthermore, one or both of the temporal background picture model and spatial background picture model application may be further based on output from the other model. In some embodiments, one of applying the temporal background picture model is further based on the second estimated background picture or applying the spatial background picture model is further based on the first estimated background picture. In some embodiments, applying the spatial background picture model is further based on the first estimated background picture and the first confidence map, and includes determining a pixel value of the second estimated background picture using the spatial background picture model in response to a corresponding confidence value of the first confidence map not exceeding a threshold or copying a corresponding pixel value of the first estimated background picture to the second estimated background picture in response to the corresponding confidence value of the first confidence map exceeding the threshold.

Processing continues at operation 603, where the first and second estimated background pictures are combined based on the first and second confidence maps to generate a resultant estimated background picture for the input video picture. The first and second estimated background pictures may be combined using any suitable technique or techniques. In some embodiments, combining the first and second estimated background pictures based on the first and second confidence maps includes selecting, for each pixel of the resultant estimated background picture, a corresponding pixel value from the first estimated background picture in response to a corresponding value in the first confidence map exceeding a corresponding value in the second confidence map or a corresponding pixel value from the second estimated background picture in response to the corresponding value in the second confidence map exceeding the corresponding value in the first confidence map. In some embodiments, combining the first and second estimated background pictures based on the first and second confidence maps includes generating, for each pixel of the resultant estimated background picture, a weighted average of corresponding pixel values from the first and second estimated background pictures weighted using corresponding confidence values from the first and second confidence maps. In some embodiments, combining the first and second estimated background pictures based on the first and second confidence maps includes applying a neural network layer to an input volume including the first and second estimated background pictures and the first and second confidence maps to generate an output volume including the resultant estimated background picture.

Furthermore, such fusion or combination techniques may be selected based on the confidence values of the confidence maps. In some embodiments, combining the first and second estimated background pictures based on the first and second confidence maps includes generating, for each pixel of the resultant estimated background picture, a magnitude difference between confidence values of the first and second confidence maps and selecting one of a pixel value of the first or second estimated background pictures for a pixel value the resultant estimated background picture in response to the magnitude difference exceeding a threshold or generating pixel value the resultant estimated background picture as a weighted average of the pixel values of the first and second estimated background pictures in response to the magnitude difference not exceeding the threshold. In some embodiments, combining the first and second estimated background pictures based on the first and second confidence maps includes determining an overall temporal confidence value based on the first confidence map and an overall spatial confidence value based on the second confidence map, determining a magnitude difference between the overall temporal confidence value and the overall spatial confidence value, and selecting a gating based fusion in response to the magnitude difference exceeding a threshold or a linear combination fusion in response to the magnitude difference not exceeding the threshold, such that the combining the first and second estimated background pictures applies the selected one of the gating based fusion or the linear combination fusion.

Processing continues at operation 604, where the resultant estimated background picture is output for use in a computer vision application or other application. For example, the resultant estimated background picture may be stored to memory for future, transmitted to another device, deployed at a local device, or the like. In some embodiments, the resultant estimated background picture is employed in one or more of a computer vision application, a foreground object detection application, an image segmentation application, a salient motion analysis application, a video surveillance application, a human-machine interface application, an object-based video coding application, or an optical motion capture application.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity. In some embodiments, the operations discussed herein are performed by a system including a memory to store any data discussed herein and one or more processors to perform the operations.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein. In some embodiments, the operations discussed herein are performed by a nontransitory machine readable medium comprising a plurality of instructions that, in response to being executed on a computing device, cause the computing device to perform the operations.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 8:
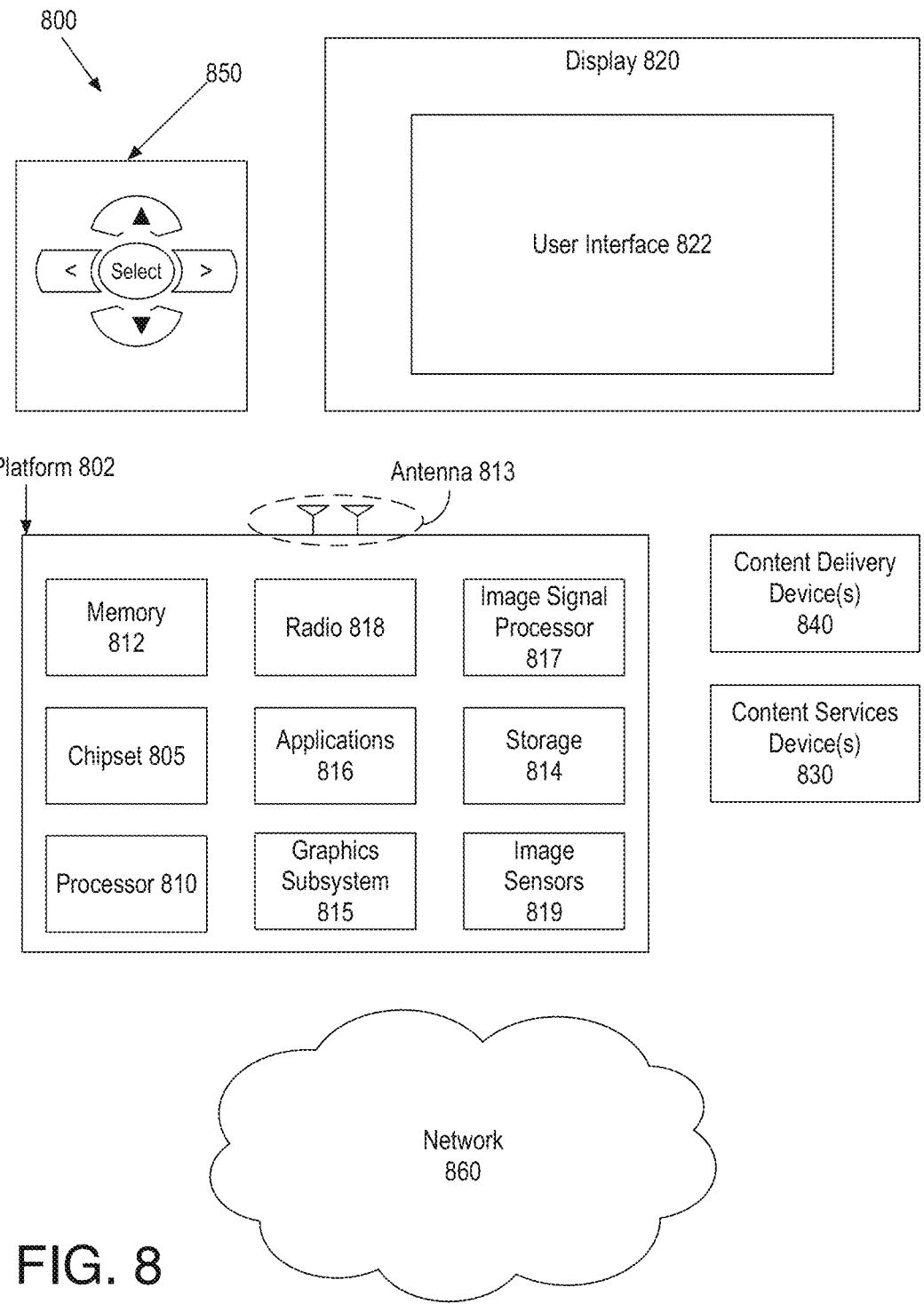
FIG. 8 is an illustrative diagram of an example system.

FIG. 8 is an illustrative diagram of an example system 800, arranged in accordance with at least some implementations of the present disclosure. In various implementations, system 800 may be a mobile device system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth.

In various implementations, system 800 includes a platform 802 coupled to a display 820. Platform 802 may receive content from a content device such as content services device(s) 830 or content delivery device(s) 840 or other content sources such as image sensors 819. For example, platform 802 may receive image data as discussed herein from image sensors 819 or any other content source. A navigation controller 850 including one or more navigation features may be used to interact with, for example, platform 802 and/or display 820. Each of these components is described in greater detail below.

In various implementations, platform 802 may include any combination of a chipset 805, processor 810, memory 812, antenna 813, storage 814, graphics subsystem 815, applications 816, image signal processor 817 and/or radio 818. Chipset 805 may provide intercommunication among processor 810, memory 812, storage 814, graphics subsystem 815, applications 816, image signal processor 817 and/or radio 818. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Image signal processor 817 may be implemented as a specialized digital signal processor or the like used for image processing. In some examples, image signal processor 817 may be implemented based on a single instruction multiple data or multiple instruction multiple data architecture or the like. In some examples, image signal processor 817 may be characterized as a media processor. As discussed herein, image signal processor 817 may be implemented based on a system on a chip architecture and/or based on a multi-core architecture.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, DisplayPort, wireless HDMI, and/or wireless HD compliant techniques. Graphics subsystem 815 may be integrated into processor 810 or chipset 805. In some implementations, graphics subsystem 815 may be a stand-alone device communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any television type monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

Image sensors 819 may include any suitable image sensors that may provide image data based on a scene. For example, image sensors 819 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 819 may include any device that may detect information of a scene to generate image data.

In various implementations, content services device(s) 830 may include a cable television box, personal computer, network, telephone, Internet enabled devices or appliance capable of delivering digital information and/or content, and any other similar device capable of uni-directionally or bi-directionally communicating content between content providers and platform 802 and/display 820, via network 860 or directly. It will be appreciated that the content may be communicated uni-directionally and/or bi-directionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of navigation controller 850 may be used to interact with user interface 822, for example. In various embodiments, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In various embodiments, navigation controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
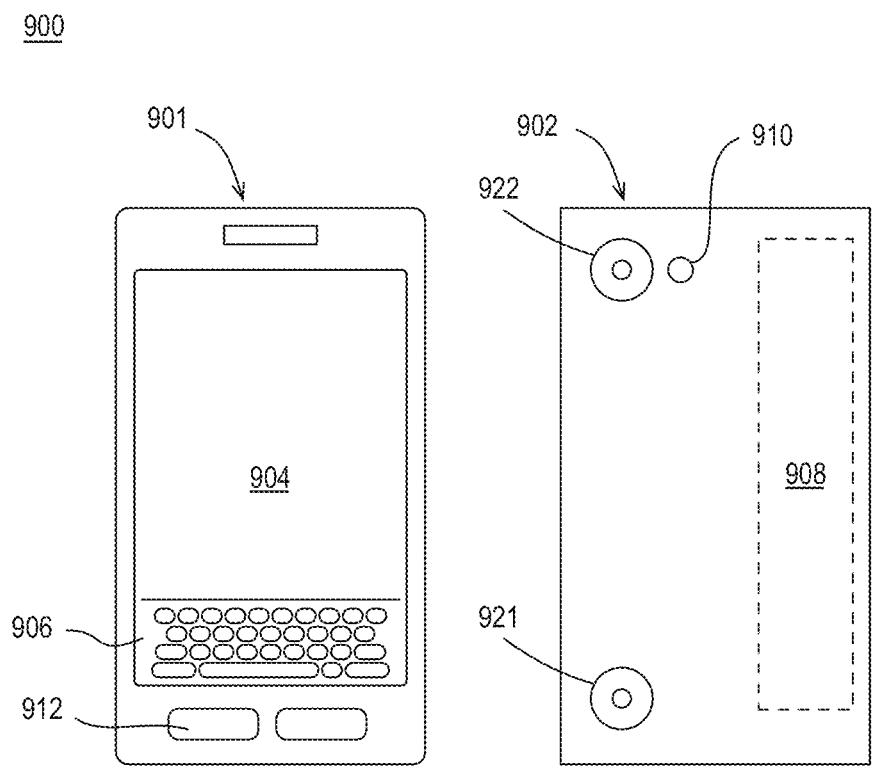
FIG. 9 illustrates an example device, all arranged in accordance with at least some implementations of the present disclosure.

As described above, system 800 may be embodied in varying physical styles or form factors. FIG. 9 illustrates an example small form factor device 900, arranged in accordance with at least some implementations of the present disclosure. In some examples, system 800 may be implemented via device 900. In other examples, other systems, components, or modules discussed herein or portions thereof may be implemented via device 900. In various embodiments, for example, device 900 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 9, device 900 may include a housing with a front 901 and a back 902. Device 900 includes a display 904, an input/output (I/O) device 906, a color camera 921, a color camera 922, and an integrated antenna 908. In some embodiments, color camera 921 and color camera 922 attain planar images as discussed herein. In some embodiments, device 900 does not include color camera 921 and 922 and device 900 attains input image data (e.g., any input image data discussed herein) from another device. Device 900 also may include navigation features 912. I/O device 906 may include any suitable I/O device for entering information into a mobile computing device. Examples for I/O device 906 may include an alphanumeric keyboard, a numeric keypad, a touch pad, input keys, buttons, switches, microphones, speakers, voice recognition device and software, and so forth. Information also may be entered into device 900 by way of microphone (not shown), or may be digitized by a voice recognition device. As shown, device 900 may include color cameras 921, 922, and a flash 910 integrated into back 902 (or elsewhere) of device 900. In other examples, color cameras 921, 922, and flash 910 may be integrated into front 901 of device 900 or both front and back sets of cameras may be provided. Color cameras 921, 922 and a flash 910 may be components of a camera module to originate color image data with IR texture correction that may be processed into an image or streaming video that is output to display 904 and/or communicated remotely from device 900 via antenna 908 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for performing video background estimation comprises applying a temporal background picture model based on an input video picture and one or more temporally prior input video pictures to generate a first estimated background picture and a corresponding first confidence map for the input video picture, applying a spatial background picture model based on the input video picture to generate a second estimated background picture and a corresponding second confidence map for the input video picture, and combining the first and second estimated background pictures based on the first and second confidence maps to generate a resultant estimated background picture for the input video picture.

In one or more second embodiments, further to the first embodiment, the method further comprises applying foreground object detection to the input video picture to generate a foreground object mask, wherein at least one of generating the first estimated background picture and the first confidence map or generating the second estimated background picture and the second confidence map is further based on the foreground object mask.

In one or more third embodiments, further to the first or second embodiments, the first confidence map comprises one of a distance between corresponding pixel values of the first estimated background picture and the input video picture or a variance of a statistical model used to generate the first estimated background picture.

In one or more fourth embodiments, further to any of the first through third embodiments, generation of the second estimated background picture and the second confidence map comprises application of a neural network layer to an input volume based on the input video picture to generate an output volume comprising the second estimated background picture and the second confidence map.

In one or more fifth embodiments, further to any of the first through fourth embodiments, combining the first and second estimated background pictures based on the first and second confidence maps comprises selecting, for each pixel of the resultant estimated background picture, a corresponding pixel value from the first estimated background picture in response to a corresponding value in the first confidence map exceeding a corresponding value in the second confidence map or a corresponding pixel value from the second estimated background picture in response to the corresponding value in the second confidence map exceeding the corresponding value in the first confidence map.

In one or more sixth embodiments, further to any of the first through fifth embodiments, combining the first and second estimated background pictures based on the first and second confidence maps comprises generating, for each pixel of the resultant estimated background picture, a weighted average of corresponding pixel values from the first and second estimated background pictures weighted using corresponding confidence values from the first and second confidence maps.

In one or more seventh embodiments, further to any of the first through sixth embodiments, combining the first and second estimated background pictures based on the first and second confidence maps comprises applying a neural network layer to an input volume comprising the first and second estimated background pictures and the first and second confidence maps to generate an output volume comprising the resultant estimated background picture.

In one or more eighth embodiments, further to any of the first through seventh embodiments, combining the first and second estimated background pictures based on the first and second confidence maps comprises generating, for each pixel of the resultant estimated background picture, a magnitude difference between confidence values of the first and second confidence maps and selecting one of a pixel value of the first or second estimated background pictures for a pixel value the resultant estimated background picture in response to the magnitude difference exceeding a threshold or generating pixel value the resultant estimated background picture as a weighted average of the pixel values of the first and second estimated background pictures in response to the magnitude difference not exceeding the threshold.

In one or more ninth embodiments, further to any of the first through eighth embodiments, combining the first and second estimated background pictures based on the first and second confidence maps comprises determining an overall temporal confidence value based on the first confidence map and an overall spatial confidence value based on the second confidence map, determining a magnitude difference between the overall temporal confidence value and the overall spatial confidence value, and selecting a gating based fusion in response to the magnitude difference exceeding a threshold or a linear combination fusion in response to the magnitude difference not exceeding the threshold, wherein the combining the first and second estimated background pictures applies the selected one of the gating based fusion or the linear combination fusion.

In one or more tenth embodiments, further to any of the first through ninth embodiments, one of applying the temporal background picture model is further based on the second estimated background picture or applying the spatial background picture model is further based on the first estimated background picture.

In one or more eleventh embodiments, further to any of the first through tenth embodiments, applying the spatial background picture model is further based on the first estimated background picture and the first confidence map, and comprises determining a pixel value of the second estimated background picture using the spatial background picture model in response to a corresponding confidence value of the first confidence map not exceeding a threshold or copying a corresponding pixel value of the first estimated background picture to the second estimated background picture in response to the corresponding confidence value of the first confidence map exceeding the threshold.

In one or more twelfth embodiments, a device or system includes a memory and one or more processors to perform a method according to any one of the above embodiments.

In one or more thirteenth embodiments, at least one machine readable medium includes a plurality of instructions that in response to being executed on a computing device, cause the computing device to perform a method according to any one of the above embodiments.

In one or more fourteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for performing video background estimation, the system comprising:
    memory to store an input video picture;
    computer readable instructions; and
    at least one processor circuit to be programmed by the computer readable instructions to:
        generate a first estimated background picture and a corresponding first confidence map for the input video picture based on a temporal model;
        generate a second estimated background picture and a corresponding second confidence map for the input video picture based on a spatial model;
        select a fusion technique from among a plurality of available fusion techniques to combine the first estimated background picture and the second estimated background picture, selection of the fusion technique based on a magnitude difference between a confidence value corresponding to the first confidence map and a confidence value corresponding to the second confidence map; and
        combine the first estimated background picture and the second estimated background picture based on the selected fusion technique to generate a resultant estimated background picture for the input video picture.

2. The system of claim 1, wherein one or more of the at least one processor circuit is to generate a foreground object mask for the input video picture, wherein the generation of at least one of the first estimated background picture and the first confidence map or the generation of the second estimated background picture and the second confidence map is based on the foreground object mask.

3. The system of claim 1, wherein the first confidence map includes one of a distance between corresponding pixel values of the first estimated background picture and the input video picture or a variance of a statistical model used to generate the first estimated background picture.

4. The system of claim 1, wherein to generate the second estimated background picture and the second confidence map, one or more of the at least one processor circuit is to apply a neural network layer to an input volume based on the input video picture to generate an output volume, the output volume including the second estimated background picture and the second confidence map.

5. The system of claim 1, wherein at least one of the available fusion techniques is to cause one or more of the at least one processor circuit to combine the first estimated background picture and the second estimated background picture by selecting, for a pixel of the resultant estimated background picture, (i) a corresponding pixel value from the first estimated background picture in response to a corresponding value in the first confidence map exceeding a corresponding value in the second confidence map, or (ii) a corresponding pixel value from the second estimated background picture in response to the corresponding value in the second confidence map exceeding the corresponding value in the first confidence map.

6. The system of claim 1, wherein at least one of the available fusion techniques is to cause one or more of the at least one processor circuit to combine the first estimated background picture and the second estimated background picture by generating, for a pixel of the resultant estimated background picture, a weighted average of corresponding pixel values from the first estimated background picture and the second estimated background picture, the corresponding pixel values from the first estimated background picture and the second estimated background picture weighted based on corresponding confidence values from the first confidence map and the second confidence map.

7. The system of claim 1, wherein at least one of the available fusion techniques is to cause one or more of the at least one processor circuit to combine the first estimated background picture and the second estimated background picture by applying a neural network layer to an input volume to generate an output volume including the resultant estimated background picture, the input volume including the first estimated background picture, the first confidence map, the second estimated background picture, and the second confidence map.

8. The system of claim 1, wherein the magnitude difference corresponds to a pixel of the resultant estimated background picture, and to select the fusion technique, one or more of the at least one processor circuit is to:
select a first one of the available fusion techniques in response to the magnitude difference exceeding a threshold, the first one of the available fusion techniques to select one of a corresponding pixel value of the first estimated background picture or a corresponding pixel value of the second estimated background picture to be a pixel value of the pixel of the resultant estimated background picture; and
select a second one of the available fusion techniques in response to the magnitude difference not exceeding the threshold, the second one of the available fusion techniques to set the pixel value of the pixel of the resultant estimated background picture based on a weighted average of the corresponding pixel values of the first estimated background picture and the second estimated background picture.

9. The system of claim 1, wherein the confidence value of the first confidence map is an overall temporal confidence value, the confidence value of the second confidence map is an overall spatial confidence value, and one or more of the at least one processor circuit is to:
determine the overall temporal confidence value based on the first confidence map and the overall spatial confidence value based on the second confidence map; and
to select the fusion technique, one or more of the at least one processor circuit is further to:
select a first one of the available fusion techniques in response to the magnitude difference exceeding a threshold; and
select a second one of the available fusion techniques in response to the magnitude difference not exceeding the threshold.

10. The system of claim 1, wherein one or more of the at least one processor circuit is to:
generate the first estimated background picture and the first confidence map based on the second estimated background picture; or
generate the second estimated background picture and the second confidence map based on the first estimated background picture.

11. The system of claim 1, wherein one or more of the at least one processor circuit is to:
determine a pixel value of a pixel of the second estimated background picture based on the spatial model in response to a corresponding confidence value of the first confidence map not exceeding a threshold; or
copy a corresponding pixel value of the first estimated background picture to the pixel of the second estimated background picture in response to the corresponding confidence value of the first confidence map exceeding the threshold.

12. A method for performing video background estimation, the method comprising:
generating a first estimated background picture and a corresponding first confidence map for an input video picture based on a temporal model;
generating a second estimated background picture and a corresponding second confidence map for the input video picture based on a spatial model;
selecting, by at least one processor circuit programmed by at least one instruction, a fusion technique from among a plurality of available fusion techniques to combine the first estimated background picture and the second estimated background picture, selection of the fusion technique based on a magnitude difference between a confidence value corresponding to the first confidence map and a confidence value corresponding to the second confidence map; and
combining the first estimated background picture and the second estimated background picture based on the selected fusion technique to generate a resultant estimated background picture for the input video picture.

13. The method of claim 12, wherein at least one of the available fusion techniques includes selecting, for a pixel of the resultant estimated background picture, (i) a corresponding pixel value from the first estimated background picture in response to a corresponding value in the first confidence map exceeding a corresponding value in the second confidence map, or (ii) a corresponding pixel value from the second estimated background picture in response to the corresponding value in the second confidence map exceeding the corresponding value in the first confidence map.

14. The method of claim 12, wherein at least one of the available fusion techniques includes generating, for a pixel of the resultant estimated background picture, a weighted average of corresponding pixel values from the first estimated background picture and the second estimated background picture, the corresponding pixel values from the first estimated background picture and the second estimated background picture weighted based on corresponding confidence values from the first confidence map and the second confidence map.

15. The method of claim 12, wherein at least one of the available fusion techniques includes applying a neural network layer to an input volume to generate an output volume including the resultant estimated background picture, the input volume including the first estimated background picture, the first confidence map, the second estimated background picture, and the second confidence map.

16. The method of claim 12, wherein:
the generating of the first estimated background picture and the first confidence map is based on the second estimated background picture; or
the generating of the second estimated background picture and the second confidence map is based on the first estimated background picture.

17. At least one article of manufacture comprising instructions to cause a computing device to at least:
generate a first estimated background picture and a corresponding first confidence map for an input video picture based on a temporal model;
generate a second estimated background picture and a corresponding second confidence map for the input video picture based on a spatial model;
select a fusion technique from among a plurality of available fusion techniques to combine the first estimated background picture and the second estimated background picture, selection of the fusion technique based on a magnitude difference between a confidence value corresponding to the first confidence map and a confidence value corresponding to the second confidence map; and
combine the first estimated background picture and the second estimated background picture based on the selected fusion technique to generate a resultant estimated background picture for the input video picture.

18. The at least one article of manufacture of claim 17, wherein at least one of the available fusion techniques is to select, for a pixel of the resultant estimated background picture, (i) a corresponding pixel value from the first estimated background picture in response to a corresponding value in the first confidence map exceeding a corresponding value in the second confidence map, or (ii) a corresponding pixel value from the second estimated background picture in response to the corresponding value in the second confidence map exceeding the corresponding value in the first confidence map.

19. The at least one article of manufacture of claim 17, wherein at least one of the available fusion techniques is to generate, for a pixel of the resultant estimated background picture, a weighted average of corresponding pixel values from the first estimated background picture and the second estimated background picture, the corresponding pixel values from the first estimated background picture and the second estimated background picture weighted based on corresponding confidence values from the first confidence map and second confidence map.

20. The at least one article of manufacture of claim 17, wherein the instructions are to cause the computing device to at least one of:
generate the first estimated background picture and the first confidence map is based on the second estimated background picture; or
generate the second estimated background picture and the second confidence map is based on the first estimated background picture.

* * * * *